(12) United States Patent
Thorsen et al.

(10) Patent No.: US 12,480,474 B2
(45) Date of Patent: Nov. 25, 2025

(54) METHOD FOR CONTROLLING WIND TURBINES OF A WIND PARK USING A TRAINED AI MODEL

(71) Applicant: VESTAS WIND SYSTEMS A/S, Aarhus N. (DK)

(72) Inventors: Morten Tim Thorsen, Tilst (DK); Roberto Ugo Di Cera Colazingari, Oporto (PT); Casper Hillerup Lyhne, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 483 days.

(21) Appl. No.: 17/947,405

(22) Filed: Sep. 19, 2022

(65) Prior Publication Data

US 2023/0089046 A1  Mar. 23, 2023

(30) Foreign Application Priority Data

Sep. 17, 2021 (EP) .................................. 21197446

(51) Int. Cl.
  *G06F 3/048* (2013.01)
  *F03D 7/02* (2006.01)
  *F03D 7/04* (2006.01)

(52) U.S. Cl.
  CPC .......... *F03D 7/048* (2013.01); *F03D 7/0264* (2013.01); *F03D 7/045* (2013.01); *F03D 7/046* (2013.01);
  (Continued)

(58) Field of Classification Search
  CPC .......... F03D 7/045; F03D 7/046; F03D 7/048; F03D 7/0264; F03D 17/0065;
  (Continued)

(56) References Cited

U.S. PATENT DOCUMENTS

| | | |
|---|---|---|
| 6,975,925 B1 | 12/2005 | Barnes et al. |
| 2016/0153425 A1* | 6/2016 | Torbohm ................ F03D 7/028 416/41 |

(Continued)

FOREIGN PATENT DOCUMENTS

| | | |
|---|---|---|
| EP | 2251543 A1 | 11/2010 |
| EP | 2728178 A1 | 5/2014 |

(Continued)

OTHER PUBLICATIONS

Office Action received for European Patent Application No. 21197446.4, mailed on Jan. 10, 2025, 4 pages.

(Continued)

*Primary Examiner* — Aleksey Olshannikov
(74) *Attorney, Agent, or Firm* — Patterson + Sheridan, LLP; Gero G. McClellan

(57) ABSTRACT

A method for controlling wind turbines. Incident signal data is obtained from wind turbines and fed to an artificial intelligence (AI) model in order to identify patterns in the incident signals generated by the wind turbines. One or more actions are associated to the identified patterns, based on identified actions performed by the wind turbines in response to the generated incident signals. During operation of the wind turbines, one or more incident signals from one or more wind turbines are detected and compared to patterns identified by the AI model. In the case that the detected incident signal(s) match(es) at least one of the identified patterns, the wind turbine(s) are controlled by performing the action(s) associated with the matching pattern(s).

11 Claims, 2 Drawing Sheets

(52) U.S. Cl.
CPC ............... *F05B 2270/1077* (2020.08); *F05B 2270/3201* (2013.01); *F05B 2270/402* (2013.01)

(58) Field of Classification Search
CPC ............ F03D 17/007; F05B 2270/1077; F05B 2270/3201; F05B 2270/322; F05B 2270/709; F05B 2270/402; Y02E 10/72
See application file for complete search history.

(56) References Cited

U.S. PATENT DOCUMENTS

| | | | |
|---|---|---|---|
| 2018/0320658 A1* | 11/2018 | Herzog | F03D 7/045 |
| 2020/0210824 A1* | 7/2020 | Poornaki | G05B 23/0221 |
| 2022/0364545 A1* | 11/2022 | Zen | F03D 7/048 |

FOREIGN PATENT DOCUMENTS

| | | |
|---|---|---|
| EP | 3862561 A1 | 8/2021 |
| WO | 2021037751 A1 | 3/2021 |

OTHER PUBLICATIONS

European Patent Office, Extended European Search Report Report for Application 21197446.4-1007 dated Apr. 3, 2022.
Intention to grant received for EP Patent Application No. 21197446.4, mailed on Aug. 27, 2025, 8 pages.

\* cited by examiner

METHOD FOR CONTROLLING WIND TURBINES OF A WIND PARK USING A TRAINED AI MODEL

FIELD OF THE INVENTION

The present invention relates to a method for controlling wind turbines of a wind park, using a trained artificial intelligence (AI) model. The method according to the invention allows the wind turbines to react to extreme events, such as extreme weather events, early, thereby reducing the risk of damage to the wind turbines.

BACKGROUND OF THE INVENTION

When a wind turbine experiences extreme conditions, e.g. in the form of high wind speeds exceeding design limits of the wind turbine, the wind turbine normally needs to shut down in order to protect the wind turbine. In order to ensure this, wind turbines are provided with safety systems which automatically causes the wind turbine to shut down, or perform other relevant actions, when certain limits are exceeded, for instance when the mean wind speed exceeds a predefined threshold for a specified time interval, typically 10 minutes, or when other kind of alarms are triggered.

Occasionally, weather changes fast and unpredictably. In this case the safety system of the wind turbine may detect that other design parameters of the wind turbine are exceeded, and will cause shut down of the wind turbine based thereon.

When incidents, such as anomalies, faults, exceeded design limits, etc., are detected during operation of the wind turbine, incident signals corresponding to the detected incidents are generated. The incident signals could, e.g., be in the form of a warning alerting an operator that attention is required, an alarm which may cause automatic shut down of the wind turbine, or any other suitable kind of incident signal. The incident signals normally have a code which uniquely identifies the kind of incident which triggered the incident signal.

On rare occasions, when an extreme weather event moves through a wind park, some of the wind turbines of the wind park may detect alarm states causing the wind turbines to shut down, while other wind turbines do not detect such alarm states and therefore continue operating. This may lead to damage on the wind turbines which continue operating, e.g. until these wind turbines also detect alarm states and therefore shut down.

DESCRIPTION OF THE INVENTION

It is an object of embodiments of the invention to provide a method for controlling wind turbines of a wind park, in which the risk of damage to the wind turbines during extreme weather events is reduced.

The invention provides a method for controlling wind turbines of a wind park, the wind park comprising a plurality of wind turbines, the method comprising the steps of:
- obtaining incident signal data from a plurality of data providing wind turbines, the incident signal data including incident signals generated by the data providing wind turbines,
- feeding the incident signal data to an artificial intelligence (AI) model and training the AI model by means of the incident signal data in order to identify patterns in the incident signals generated by the data providing wind turbines,
- identifying actions performed by the data providing wind turbines in response to the generated incident signals, and, based thereon, associating one or more actions to the identified patterns,
- during operation of the wind turbines of the wind park, detecting one or more incident signals from one or more wind turbines of the wind park,
- comparing the detected incident signal(s) to patterns identified by the AI model, and
- in the case that the detected incident signal(s) match(es) at least one of the identified patterns, controlling the wind turbine(s) of the wind park by performing the action(s) associated with the matching pattern(s).

Thus, the method according to the invention is a method for controlling wind turbines of a wind park. In the present context the term 'wind park' should be interpreted to mean a collection of two or more wind turbines arranged within a limited geographical area, the wind turbines sharing various infrastructure, such as access roads, communication lines, connection to power grid, substations, etc. Thus, the wind park comprises a plurality of wind turbines.

In the method according to the invention, incident signal data is initially obtained from a plurality of data providing wind turbines. In the present context the term 'data providing wind turbine' should be interpreted to be a wind turbine which contributes to the incident signal data which is obtained or collected during this first step of the method. Accordingly, the incident signal data being collected originates from the plurality of data providing wind turbines.

The data providing wind turbine will typically be other wind turbines than the ones forming part of the wind park, e.g. wind turbines forming part of other wind parks. However, it is not ruled out that some or all of the wind turbines forming part of the wind park, i.e. the wind turbines being controlled by means the method according to the invention, provide incident signal data, and thereby form part of the plurality of data providing wind turbines.

The incident signal data includes incident signals generated by the data providing wind turbines. In the present context the term 'incident signal' should be interpreted to mean a signal which has been generated by one of the data providing wind turbines in response to an incident which has been experienced by the data providing wind turbine. The incident could, e.g., be one or more sensor readings falling outside specified limit values. In this case the sensors may, e.g., measure ambient or weather conditions, such as wind speed, change in wind speed, wind direction, change in wind direction, turbulence, gust conditions, ambient temperature, humidity, precipitation, air density, etc. Alternatively or additionally, the sensors may measure various parameters of the wind turbines, such as temperatures in various parts of the wind turbines, blade deflection, tower deflection, tower oscillations, yaw error, etc.

Thus, the incident signals are signals generated by the data providing wind turbines, and indicating that specific incidents, such as high wind, faults, excessive deflection, etc., have been experienced by the data protecting wind turbines. Accordingly, the incident signals may be in the form of warnings and/or alarms generated by the data providing wind turbines. The incident signals thereby provide information that a given data providing wind turbine has experienced a specific incident which has triggered that the data providing wind turbine generated a corresponding incident signal.

Since incident signals triggered by a given incident normally identifies the underlying incident, e.g. by providing the incident signals with a code which uniquely corresponds to the underlying incident, it is possible to apply incident signals from various types of wind turbines, even if design limits with regard to ambient conditions and operating parameters vary from one type of wind turbine to another. Thus, exactly which ambient conditions or sensor values triggered the incident signals is not important. The key is that a given data providing wind turbine experienced conditions which caused it to generate a specific kind of incident signal. This significantly increases the number of wind turbines which qualify as data providing wind turbines for the present purpose.

The incident signal data may further include information regarding actions taken by the data providing wind turbines in response to the generated incident signals.

The incident signal data may be retrieved from historical operating data from a vast number of wind turbines, e.g. from a fleet of wind parks. Alternatively or additionally, training data may be obtained specifically from a specified number of wind turbines, e.g. the wind turbines of the wind park.

Next the incident signal data is fed to an artificial intelligence (AI) model, and the AI model is trained by means of the incident signal data. Thereby patterns are identified in the incident signals generated by the data providing wind turbines.

The identified patterns could, e.g., include combinations of kinds of incident signals and/or the sequence of the incident signals generated by the data providing wind turbines. Furthermore, the patterns could include combinations of incident signals generated by data providing wind turbines arranged near each other, e.g. data providing wind turbines arranged within the same wind park.

Next, actions performed by the data providing wind turbines in response to the generated incident signals are identified. As described above, this information could form part of the incident signal data which was fed to the AI model. As an alternative, this information may be added when the AI model has identified the patterns.

The actions could, e.g., include shutting down the wind turbine, changing upper and/or lower limit values for one or more operating parameters, e.g. by narrowing an operation range for one or more parameters, switching operation of the wind turbine to a safety mode, etc.

Based on the identified actions, one or more actions are associated to the patterns which were identified by the AI model. Accordingly, connections or correlations are established between the patterns of incident signals, such as sequences of incident signals, and actions performed by the wind turbines. Since this is done based on actual actions performed by actual wind turbines in response to the generation of actual incident signals, it can be assumed that an action being associated to a give pattern of incident signals is an action which it is appropriate for the wind turbine be perform when it experiences that pattern of incident signals. This association of actions to the patterns may be referred to as 'labelling', and the patterns with the associated actions may be referred to as 'labelled patterns'.

Next, during operation of the wind turbines of the wind park, i.e. the wind turbines being controlled in accordance with the method according to the invention, one or more incident signals are detected from one or more of the wind turbines of the wind park.

The detected incident signal(s) is/are compared to the patterns identified by the AI model. In the case that there is a match between the detected incident signal(s) and at least one of the patterns which were identified by the AI model, it may be assumed that the wind turbine(s) which generated the incident signal(s) is/are experiencing conditions which are similar to the conditions which were experienced by the data providing wind turbines which generated the incident signals which lead to the pattern. Accordingly, it can be assumed that the wind turbine which is now generating similar incident signals could appropriately perform the actions which were also performed by the data providing wind turbines. Therefore, in this case the wind turbine(s) of the wind park are controlled by performing the action(s) associated with the matching pattern(s).

Thereby a given wind turbine can be controlled to perform such appropriate actions, e.g. shutting down the wind turbine, as soon as it is recognised that the incident signals being generated by the wind turbine follow a pattern which is very likely to cause the wind turbine to perform the action(s) itself in the near future. Accordingly, actions which protect the wind turbine from damage in case of extreme weather events or the like, can be performed at an early stage, thereby significantly reducing the risk of severe damage to the wind turbine.

It is an advantage that the patterns are identified by an AI model, because this significantly reduces the amount of manual work required. Furthermore, this allows patterns to be identified which are not necessarily evident to the human eye. For instance, it may require significant effort to uncover or describe the complex patterns and/or correlations of the generated incident signals, and this may render it impossible to perform the task manually.

The method may further comprise the step of monitoring wind conditions at a site of the wind park, and the step of controlling the wind turbine(s) of the wind park may further be based on the monitored wind conditions.

According to this embodiment, the wind conditions prevailing at the site of the wind park are also taken into account when selecting actions to be performed by the wind turbines in response to a detected match between incident signals generated by the wind turbine and one or more of the identified patterns. For instance, the wind conditions may be regarded as forming part of the patterns. In this case, one identified pattern could be a combination of a wind speed exceeding a certain threshold value, and one or more warnings and/or alarms generated based on sensor signals from the wind turbine. Furthermore, certain wind conditions, such as high wind speeds, may give rise to incident signals being generated, and in this case such detected wind conditions will naturally form part of the patterns of incident signals.

Examples of wind conditions include, but are not limited to, the wind speed exceeding a certain threshold value, an increase in wind speed exceeding a certain threshold value, gust conditions, the wind direction, a change in wind direction exceeding a certain threshold value, etc.

As described above, the incident signals may include warnings and/or alarms. In the present context the term 'warning' should be interpreted to mean a signal generated by the wind turbine, which alerts an operator that something needs attention, but the detected anomaly is not critical to the continued operation of the wind turbine at the present. Accordingly, in response to a warning, the wind turbine will normally not be shut down, but it might be operated in a protected or downrated mode.

In the present context the term 'alarm' should be interpreted to means a signal generated by the wind turbine, which indicates that a critical fault or condition has been detected. An alarm may very well cause the wind turbine to automatically shut down.

The actions being associated with the identified patterns may include shutting down one or more wind turbines.

Alternatively or additionally, the actions may include operating one or more wind turbines in a protected and/or downrated mode, changing limit values of parameter ranges of one or more control parameters and/or sensor parameters, and/or any other suitable kind of action.

The step of controlling the wind turbines of the wind park may comprise shutting down one or more wind turbines of the wind park, before shut down procedures at the one or more wind turbines have been initiated based on warnings or alarms generated by the wind turbines themselves.

According to this embodiment, in the case that it is detected that a wind turbine is generating incident signals which match a pattern, which is likely to lead to shut down of the wind turbine, the wind turbine is shut down immediately instead of awaiting the next incident signal(s) which will most likely cause the safety system of the wind turbine to shut down the wind turbine. Accordingly, the wind turbine is shut down at an early stage, and the risk of damage to the wind turbine, e.g. due to severe weather conditions, can be reduced.

The method may further comprise the steps of:
obtaining incident signal data from the wind turbines of the wind park, during operation of the wind park,
feeding the obtained incident signal data to the AI model, and
retraining the AI model based on the incident signal data, thereby improving the AI model.

According to this embodiment, the AI model is continuously retrained and improved, based on data obtained from operating wind turbines.

The method may further comprise the step of determining that an extreme weather event is occurring, based on the step of comparing the detected incident signal(s) to patterns identified by the AI model.

According to this embodiment, historical incident signal data may reveal that when certain extreme weather events are occurring, then certain patterns of incident signals will most likely be generated by the wind turbines experiencing the extreme weather events. Thus, when a pattern of incident signals is detected, which has previously been associated with an extreme weather event, then it is determined that such an extreme weather event is most likely occurring, and precautions can thereby be taken at an early stage. For instance, if it is determined that an extreme weather event is occurring, the wind turbine generating the relevant pattern of incident signals may be shut down. Furthermore, neighbouring wind turbines, wind turbines arranged directly downstream of the wind turbine, or possibly all wind turbines of the wind park may additionally be shut down, depending on the kind of extreme weather event.

Examples of extreme weather events include, but are not limited to, extremely high wind speeds, fast change in wind direction, extreme turbulence conditions, tornados, etc.

The patterns identified by the AI model may include patterns in which identical or similar incident signals have been generated by two or more data providing wind turbines arranged in the same wind park.

According to this embodiment, a given pattern of incident signals is not necessarily based on incident signals generated by a single wind turbine, but rather includes incident signals generated by two or more wind turbines arranged in the same wind park, and thereby in the vicinity of each other.

For example, the pattern may include the same kind of warning or alarm being generated by two or more wind turbines arranged in the same wind park, possibly with a time delay there between. For instance, an upstream wind turbine may initially detect wind speeds exceeding design limits and generate a corresponding warning or alarm. Subsequently, the high wind speed will travel through the wind park, causing downstream wind turbines to sequentially generate the same warning or alarm. When such a pattern is detected, it may be assumed that the wind turbines arranged further downstream will also detect the high wind speeds in the near future, and therefore the actions performed by the upstream wind turbines in response to the generated warning or alarm can immediately be performed at the downstream wind turbines as well, thereby reducing the risk of damage to these downstream wind turbines.

Alternatively or additionally, one or more of the identified patterns may be based on identical or similar incident signals generated by two or more data providing wind turbines arranged two or more wind parks.

The method may further comprise the step of controlling at least one of the wind turbines of the wind park by performing an action, in response to a match between detected incident signal(s) of another wind turbine of the wind park and at least one of the identified patterns.

As described above, if the matching pattern corresponds to a situation which is likely to affect other wind turbines of the wind park than the one generating the incident signal(s), then it may be relevant to proactively perform relevant actions to such other wind turbines, e.g. by shutting them down, downrating them, changing operating parameter ranges, etc.

BRIEF DESCRIPTION OF THE DRAWINGS

The invention will now be described in further detail with reference to the accompanying drawings in which.

DETAILED DESCRIPTION OF THE DRAWINGS

Figure 1:
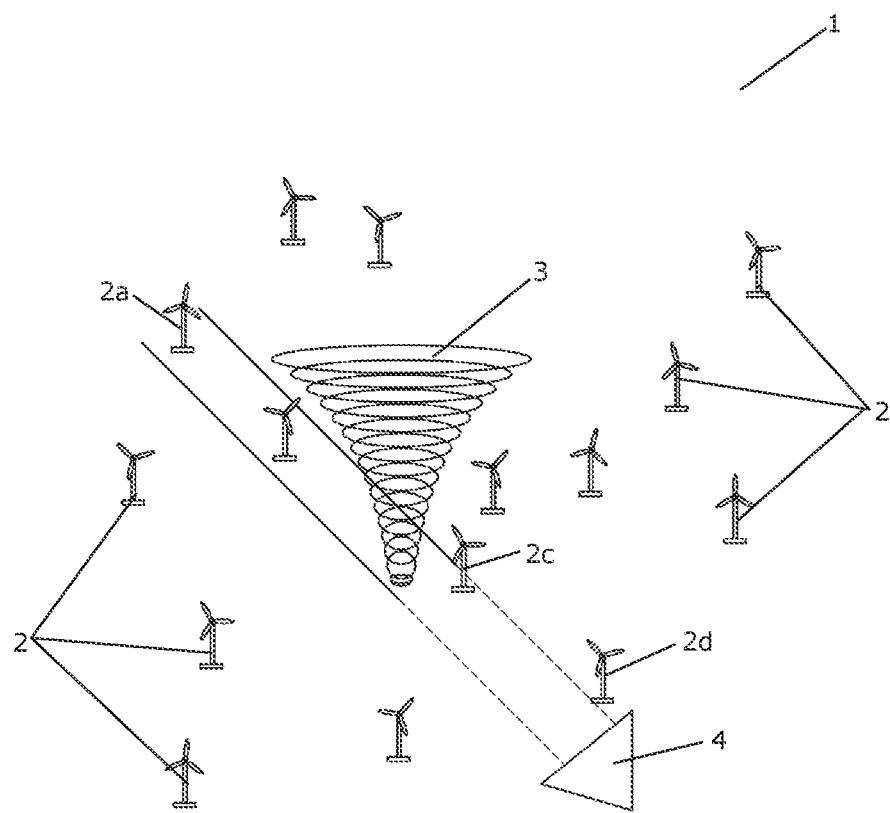
FIG. 1 illustrates an extreme weather event, in the form of a tornado, travelling through a wind park.

FIG. 1 illustrates a wind park 1 comprising a plurality of wind turbines 2. An extreme weather event, in the form of a tornado 3, is travelling through the wind park 1 along a direction indicated by arrow 4.

Wind turbines 2a and 2b have already been passed by the tornado 3. In response thereto, the wind turbines 2a and 2b have generated one or more incident signals, e.g. in the form of one or more warnings and/or one or more alarms. In response to the generated incident signals, the wind turbines 2a and 2b have performed one or more relevant actions in order to protect the wind turbines 2a, 2b from the impact of the tornado 3. For instance, the wind turbines 2a, 2b may have been shut down.

Since wind turbine 2a and wind turbine 2b have both been passed by the tornado 3, the sequence or pattern of incident signals generated by the two wind turbines 2a, 2b are most likely identical or at least very similar. However, since the tornado 3 passed wind turbine 2a before it passed wind turbine 2b, there may be a time delay between the incident signals generated by wind turbine 2a and the corresponding incident signals generated by wind turbine 2b.

Wind turbine 2c is about to be passed by the tornado 3. Accordingly, wind turbine 2c has probably already generated at least some of the incident signals which were generated by wind turbines 2a and 2b. The incident signals generated by wind turbine 2c are compared to patterns of incident signals identified by means of an AI model, e.g. in a manner which has been described previously and/or in a manner which will be described in further detail below with reference to FIG. 2.

The comparison may reveal that there is a match between one of the identified patterns and the incident signals generated by wind turbine 2c. It may further be revealed that the matching pattern also matches the incident signals generated by wind turbines 2a and 2b, and that the generated incident signals are compatible with the passage of a tornado 3. Thus, as soon as such a match is identified, wind turbine 2c is controlled in accordance therewith, e.g. by shutting down the wind turbine 2c, even if the warnings and/or alarms generated by the wind turbine 2c itself have not yet caused the wind turbine 2c to shut down.

Furthermore, since the tornado 3 is heading towards wind turbine 2d, wind turbine 2d may also have generated, e.g., the first of a sequence of incident signals, corresponding to the incident signals generated by wind turbines 2a, 2b and 2c. As described above, it has already been established that wind turbines 2a, 2b and 2c are generating identical or similar sequences of incident signals, and that this pattern is compatible with a tornado 3 passing through the wind park 2. The fact that the three wind turbines 2a, 2b and 2c have generated the same or similar sequences of incident signals may also be regarded as a pattern of incident signals. Accordingly, as soon as wind turbine 2d generates the first incident signal of the pattern of incident signals, it may be concluded that it is very likely that the tornado 3 will reach wind turbine 2d very soon. Thus, already at this stage, relevant actions, such as shutting down wind turbine 2d, may be performed.

Figure 2:
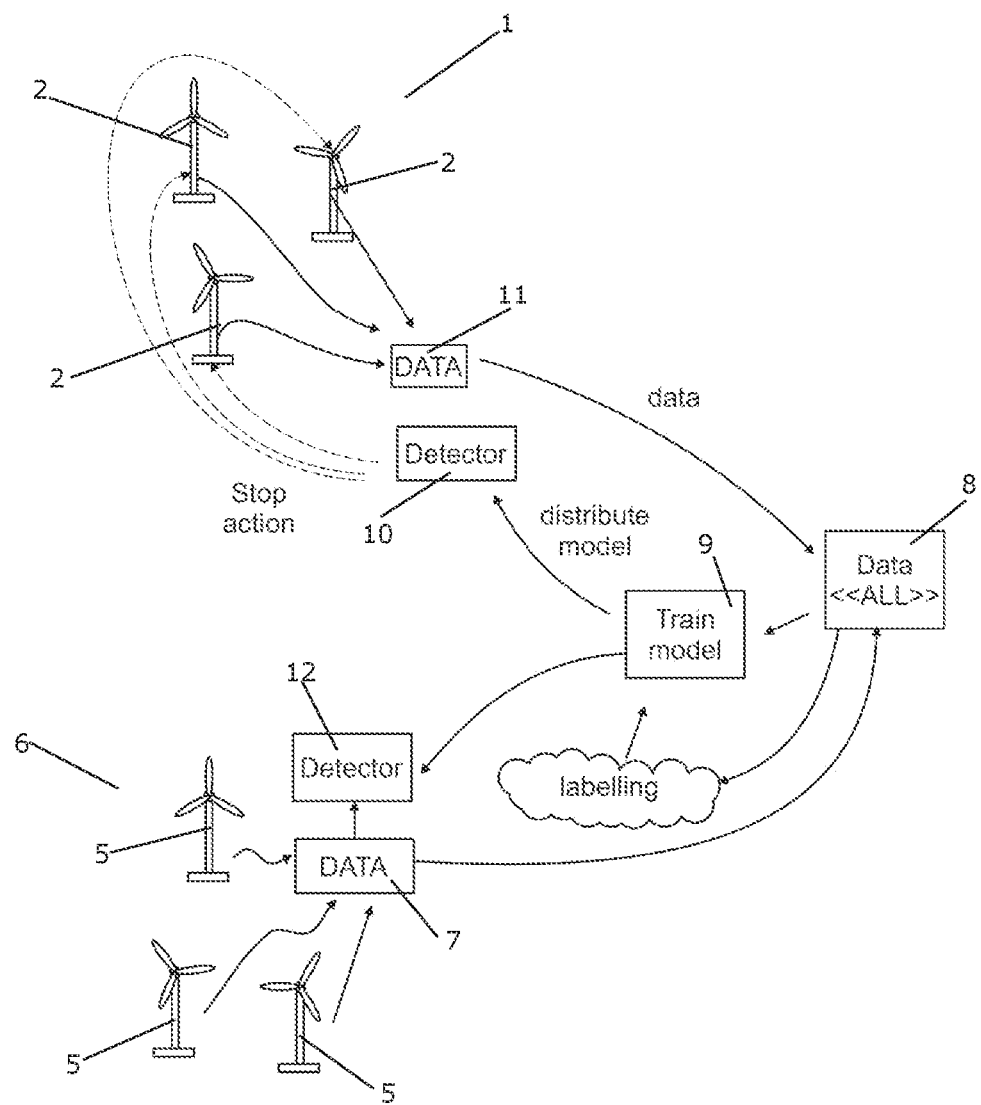
FIG. 2 illustrates control of wind turbines of a wind park in accordance with a method according to an embodiment of the invention.

FIG. 2 illustrates control of wind turbines 2 of a wind park 1 in accordance with a method according to an embodiment of the invention.

A plurality of data providing wind turbines 5, three of which are shown, arranged in a plurality of data providing wind parks 6, one of which is shown, collect data during operation of the data providing wind turbines 5. The collected data comprises incident signal data, including incident signals, such as warnings and alarms, generated by the data providing wind turbines 5. The incident signal data may further comprise information regarding actions performed by the data providing wind turbines in response to the generated incident signals.

The data providing wind turbines 5 provide the incident signal data to a local data hub 7 of the data providing wind park 6. The incident signal data from the local data hubs 7 of each of the data providing wind parks 6 is provided to a central data hub 8, and the central data hub 8 feeds the incident signal data to an AI model 9.

The wind turbines 2 of wind park 1 may also act as data providing wind turbines in the manner described above. In this case incident signal data generated by wind turbines 2 are also provided to the AI model 9, in the same manner as the incident signal data generated by the data providing wind turbines 5 of wind park 6.

The AI model is trained based on the incident signal data. Thereby patterns in the incident signals generated by the data providing wind turbines 5 are identified. Furthermore, the patterns are labelled by associating actions performed by the data providing wind turbines 5, in response to the generated incident signals, to the patterns. Thus, the labelled patterns indicate which combinations of incident signals were generated by the data providing wind turbines 5, as well as which actions the data providing wind turbines 5 performed in response thereto.

The trained model is provided to a local detector 10 of the wind park 1 to be controlled. During operation of the wind turbines 2 of the wind park 1, the wind turbines 2 collect data, including incident signals generated by the wind turbines 2, and provide this to a local data hub 11 of the wind park 1. The generated incident signals are then compared to the patterns identified by the AI model. In the case that there is a match between the incident signals generated by at least one of the wind turbines 2 and at least one of the identified patterns, the detector 10 instructs the relevant wind turbine(s) 2 to perform the action(s) associated with the matching pattern(s), e.g. shutting down one or more of the wind turbines 2.

Furthermore, the local data hub 11 provides the incident signals generated by wind turbines 2 to the central data hub 8, which in turn feeds this data to the AI model. The AI model is then re-trained, based on the additional incident signals, thereby obtaining an updated and improved model.

The trained data model may further be distributed to other wind parks, such as the data providing wind park 6. In this case the trained model is provided to a detector 12 of the data providing wind park 6, and the data providing wind turbines 5 can be controlled in the same manner as described above with reference to the wind turbines 2 of the wind park 1.

The invention claimed is:

1. A method for controlling wind turbines of a first wind park, the method comprising:
    obtaining incident signal data from a plurality of data providing wind turbines arranged in a plurality of wind parks besides the first wind park, wherein the incident signal data includes incident signals generated by the data providing wind turbines;
    feeding the incident signal data to an artificial intelligence (AI) model and training the AI model by means of the incident signal data in order to identify patterns in the incident signals generated by the data providing wind turbines, wherein the patterns identified by the AI model include combinations of identical or similar incident signals generated by two or more data providing wind turbines located in a second wind park;
    identifying one or more actions performed by the data providing wind turbines in response to the incident signals generated by the data providing wind turbines, and, based thereon, associating one or more actions to the identified patterns;
    during operation of the wind turbines of the first wind park, detecting incident signals from one or more wind turbines of the first wind park;
    comparing the incident signals from the one or more wind turbines of the first wind park to the patterns identified by the AI model; and
    in response to determining the incident signals from the one or more wind turbines of the first wind park match at least one pattern of the patterns identified by the AI model, controlling the one or more wind turbines of the first wind park by performing the one or more actions associated with the at least one pattern.

2. The method of claim 1, further comprising monitoring wind conditions at a site of the first wind park, and wherein controlling the one or more wind turbines of the first wind park is further based on the monitored wind conditions at the site of the first wind park.

3. The method of claim 1, wherein the incident signals include warnings and/or alarms.

4. The method of claim 1, wherein the one or more actions are associated with the identified patterns include shutting down one or more wind turbines.

5. The method of claim 1, wherein controlling the one or more wind turbines of the first wind park comprises shutting down the one or more wind turbines of the first wind park, before shut down procedures at the one or more wind turbines have been initiated based on warnings or alarms generated by the one or more wind turbines themselves.

6. The method of claim 1, further comprising:
obtaining incident signal data from the one or more wind turbines of the first wind park, during operation of the first wind park;
feeding the incident signal data from the one or more wind turbines of the first wind park to the AI model; and
retraining the AI model based on the incident signal data, thereby improving the AI model.

7. The method of claim 1, further comprising determining that an extreme weather event is occurring, based on comparing the incident signals from the one or more wind turbines of the first wind park to patterns identified by the AI model.

8. The method of claim 1, further comprising controlling at least one of the wind turbines of the first wind park by performing an action, in response to a match between detected incident signals of another wind turbine of the first wind park and at least one pattern of the identified patterns.

9. The method of claim 1, further comprising monitoring wind conditions at a site of the first wind park, and wherein controlling the one or more wind turbines of the first wind park is further based on the monitored wind conditions; and wherein the actions being associated with the identified patterns include shutting down the one or more wind turbines.

10. The method of claim 9, wherein controlling the one or more wind turbines of the first wind park comprises shutting down the one or more wind turbines of the first wind park, before shut down procedures at the one or more wind turbines have been initiated based on warnings or alarms generated by the wind turbines themselves.

11. A method for controlling wind turbines of a first wind park, the method comprising:
obtaining first incident signal data from a plurality of wind turbines arranged in a plurality of wind parks besides the first wind park, wherein the first incident signal data includes incident signals generated by the wind turbines;
feeding the first incident signal data to an artificial intelligence (AI) model and training the AI model by means of the first incident signal data in order to identify patterns in the incident signals generated by the wind turbines, wherein the patterns identified by the AI model include combinations of identical or similar incident signals generated by two or more wind turbines of the plurality of wind turbines, and wherein the two or more wind turbines are located in a second wind park;
identifying one or more actions performed by the two or more wind turbines in response to the incident signals generated by the wind turbines, and, based thereon, associating one or more actions to the identified patterns;
during operation of the wind turbines of the first wind park, detecting incident signals from one or more wind turbines of the first wind park;
comparing the incident signals from the one or more wind turbines of the first wind park to the patterns identified by the AI model;
in response to determining the incident signals from the one or more wind turbines of the first wind park match at least one pattern of the identified patterns, controlling the one or more wind turbines of the first wind park by performing the one or more actions associated with the at least one pattern;
obtaining second incident signal data from the wind turbines of the first wind park, during operation of the first wind park;
feeding the second incident signal data to the AI model; and
retraining the AI model based on the second incident signal data, thereby improving the AI model; and
determining that an extreme weather event is occurring, based on comparing incident signals from one or more wind turbines of the first wind park to patterns identified by the retrained AI model.

* * * * *